United States Patent
Cole et al.

(10) Patent No.: US 9,955,147 B2
(45) Date of Patent: Apr. 24, 2018

(54) ZOOM RELATED METHODS AND APPARATUS

(71) Applicant: NextVR Inc., Laguna Beach, CA (US)

(72) Inventors: David Cole, Laguna Beach, CA (US); Alan McKay Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 0 days.

(21) Appl. No.: 15/009,320

(22) Filed: Jan. 28, 2016

(65) Prior Publication Data

US 2016/0219262 A1 Jul. 28, 2016

Related U.S. Application Data

(60) Provisional application No. 62/108,962, filed on Jan. 28, 2015.

(51) Int. Cl.
| | |
|---|---|
| *H04N 13/00* | (2006.01) |
| *H04N 15/00* | (2006.01) |
| *H04N 9/80* | (2006.01) |
| *H04N 13/04* | (2006.01) |
| *H04N 13/02* | (2006.01) |
| *H04N 5/262* | (2006.01) |

(52) U.S. Cl.
CPC ....... *H04N 13/044* (2013.01); *H04N 13/0014* (2013.01); *H04N 13/0048* (2013.01); *H04N 13/0239* (2013.01); *H04N 13/0468* (2013.01); *H04N 13/0497* (2013.01)

(58) Field of Classification Search
CPC ........ H04N 13/00; H04N 15/00; H04N 5/262; H04N 9/80
USPC .... 348/42, 47, 51, 53, 240.99, 240.1, 240.2, 348/240.3; 386/242, 248, 239
See application file for complete search history.

(56) References Cited

U.S. PATENT DOCUMENTS

| | | | |
|---|---|---|---|
| 9,386,211 B2 * | 7/2016 | Soenksen | H04N 5/23206 |
| 2012/0014564 A1 * | 1/2012 | Jensen | G01C 1/04 |
| | | | 382/106 |
| 2014/0063055 A1 * | 3/2014 | Osterhout | G06F 3/005 |
| | | | 345/633 |

* cited by examiner

*Primary Examiner* — Daquan Zhao

(74) *Attorney, Agent, or Firm* — Straub & Straub; Michael P. Straub; Stephen T. Straub

(57) ABSTRACT

Methods and apparatus for implementing user controlled zoom operations during a stereoscopic, e.g., 3D, presentation are described. While viewing a 3D presentation of a scene environment, a user may switch to a zoom mode allowing the user to zoom in on a particular portion of the environment being displayed. In order to maintain the effect of being physically present at the event, and also to reduce the risk of making the user sick from sudden non-real world like changes in views of the environment, the user in response to initiating a zoom mode of operation is presented with a view which is the same or similar to that which might be expected as the result of looking through a pair of binoculars. In some embodiments the restriction in view is achieved by applying masks to enlarged version of left and right eye views to be displayed.

20 Claims, 13 Drawing Sheets

AN EXEMPLARY DISPLAYED STEREOSCOPIC SCENE
GENERATED USING LEFT AND RIGHT EYE IMAGE PAIR

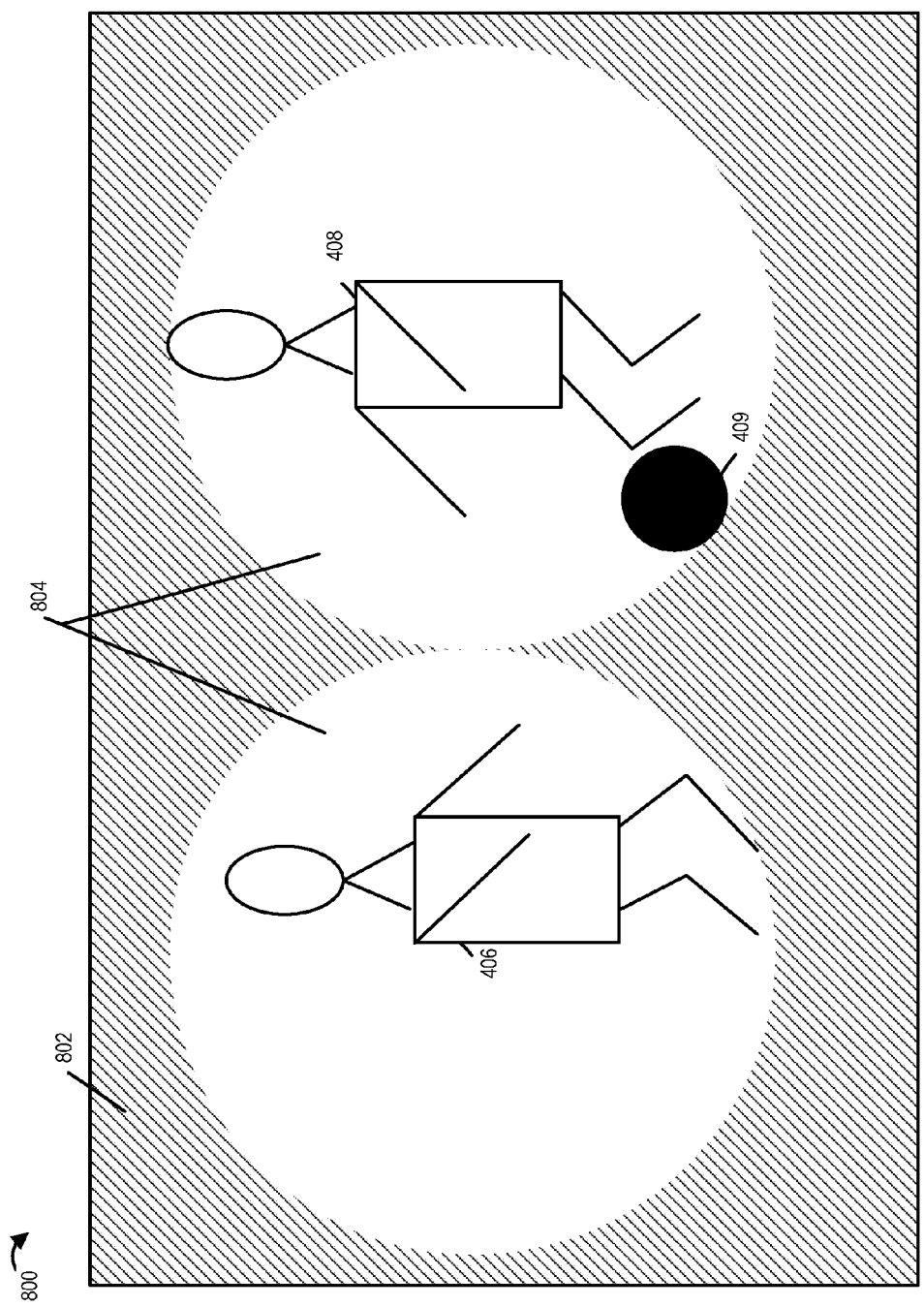

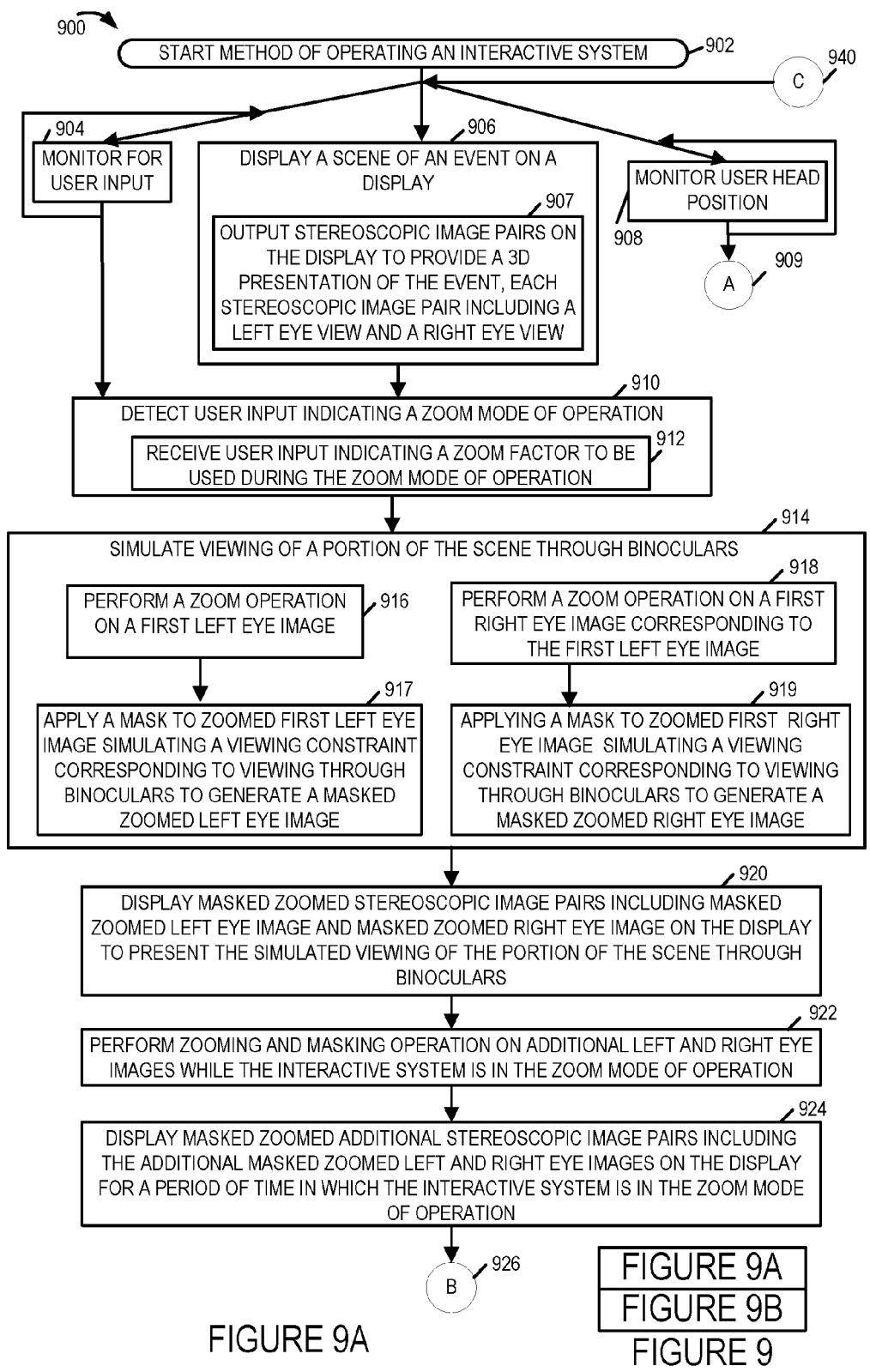

ZOOM RELATED METHODS AND APPARATUS

RELATED APPLICATIONS

The present application claims the benefit of U. S. Provisional Patent Application Ser. No. 62/108,962 filed Jan. 28, 2015 which is hereby expressly incorporated by reference in its entirety.

FIELD

The present application relates to stereoscopic playback methods and apparatus and, more particularly, to methods and apparatus relating to zoom operations.

BACKGROUND

Stereoscopic playback devices, e.g., devices which allow playback of left and right eye images providing a 3D experience to a user, are growing in popularity. It is expected that such devices will be used to display images corresponding to sporting events, fashion shows, concerts and/or other scenes and may provide the user a sense of being present within the displayed scene/environment.

During playback or presentation of a stereoscopic scene, a user may desire to zoom in on a portion of the scene being presented, e.g., on a player kicking the ball or a particular model at a fashion show. From the perspective a user immersed in a simulated 3D environment, it may be undesirable to suddenly zoom in on a portion of a scene since this may be perceived as a sudden unnatural change in the user's viewing position. A switch back to normal viewing may result in a similar undesired sudden change in perspective to the user breaking what maybe a desired sense of being present at a real event. Furthermore such sudden changes may make a user uneasy, uncomfortable or even sick, e.g., dizzy, since such changes in perspective normally do not happen in a real world environment.

In view of the above discussion it should be appreciated that there is a need for methods and apparatus which would allow a user to implement user controllable zoom operations with respect to stereoscopic images without at least some of the effects that sudden changes in zoom might create without some other action being taken to minimize or reduce what might otherwise be perceived as an unnatural change in view perspective.

SUMMARY

Methods and apparatus for implementing user controlled zoom operations during a stereoscopic, e.g., 3D, presentation are described. In various embodiments, while viewing a 3D presentation of, e.g., a sporting event, concert, other event or simulated environment, a user is provided the opportunity to switch to a zoom mode of operation allowing the user to zoom in on a particular portion of the event or environment being displayed. In order to maintain the effect of being physically present at the event, and also to reduce the risk of making the user sick from sudden non-real world like changes in views of the environment, the user in response to initiating a zoom mode of operation is presented with a view which is the same or similar to that which might be expected as the result of looking through a pair of binoculars. During the zoom mode of operation the user's view is restricted, to a portion of the displayed scene, that the user might expect to see if looking through binoculars. In such a case, the field of the scene which is observable is reduced but the image is viewed as being magnified by a zoom factor, e.g., 2×, 5×, 10×, 20× or by some other amount. In some embodiments the restriction in view is achieved by applying masks to an enlarged version of the view or views to be displayed, e.g., enlarged left and right eye views are generated and masked prior to display.

During both normal and zoom mode of operation head position is monitored. Changes in head position, e.g., rotation of a user's head or tilt of a user's head, are detected and the portion of the event or environment being displayed is changed as a function of the change in the head position. The change in the displayed image or images simulates changes in the area which would be visible to the user if the user moved his/her head in a real environment. During zoom mode of operation the zoom factor is taken into consideration in terms of how much to shift the perspective of the scene being presented to the user. For example, during a 5× zoom mode a change in head position will trigger a 5× shift in the portion of the environment being displayed reflecting the 5× viewing factor. Thus, just as small changes in viewing angle when using binoculars with a high zoom power may result in a significant change in the viewable scene the same effect is simulated during the zoom mode of operation.

User input is monitored and the zoom factor is adjusted during zoom mode operation in accordance with user input. A user change in mode from zoom mode to normal mode is also monitored for and detected in response to user input changing the mode of operation.

In response to detecting a change in operation from a zoom mode to a normal mode the enlarging and masking operations are halted and images are put out at their normal size.

The methods and apparatus of the present invention are well suited for use with streamed content as well as stored image content. In the case of sporting events or other events the methods and apparatus allow a user to get a sense and/or perspective of being at the event with initiating of zooming and the switch back to normal viewing being similar to what might be expected if a user placed a pair of binoculars to his/her eyes to focus on an area of interest during the event, e.g., where action occurs, and then removed it to come back to the normal field of view to enjoy the overall event. The use of the mask simulating the affect of binoculars reduces the risk that the zooming operation may break the effect or illusion of the user being at the event or in the real world environment while also reducing the risk that the zooming operation will cause the user to feel sick or uneasy due to what might otherwise feel like a rather unnatural change in perspective or position in the environment.

The method and apparatus of the present invention may be used with a wide range of devices capable of presenting stereoscopic images, e.g., pairs of left and right eye images intended to provide a 3D effect, to a user. For example, the methods may be used with head mounted displays in which the processing of the images, e.g., zooming, masking, etc. are performed within one or more components mounted on a users head and/or with game systems or other systems which are capable of rendering stereoscopic images which are then displayed to a user via a peripheral device, e.g., in the form of a head mounted display. An example of an embodiment where the playback device is implemented as a fully head mounted system includes the Samsung Gear VR in which a head mounted system incorporates a cell phone which is responsible for processing and displaying stereoscopic image pairs under control of user input which can be entered via a head mounted input device, e.g., touch pad. An example of a game system embodiment includes a game system such as a PS3 or PS4 or XBOX coupled, via a wire or wirelessly, to a display peripheral such as a pair of display glasses capable of displaying different images to a user's left and right eyes. In such embodiments the playback device is controlled in accordance with the invention to implement zoom operations which simulate the experience that might be encountered if binoculars were used.

The methods and apparatus of the invention can be used with a wide range of input image resolutions. In cases where the input images, e.g., left and right eye image pairs, are higher resolution than that of the display device being used, as is often the case when a cell phone display is used as the head mounted display device, the zoom methods may be implemented with little or no perceived loss in image quality due to the zooming since the zoom operation may take advantage of the otherwise unused image resolution.

Numerous additional aspects, benefits and embodiments will be discussed in the detailed description which follows.

BRIEF DESCRIPTION OF THE FIGURES

FIG. 8 illustrates a masked zoomed portion of the stereoscopic scene displayed to the viewer after a zooming and masking operation has been applied, with the displayed portion of the stereoscopic scene presenting a simulated viewing of the portion of the scene through binoculars.

FIG. 9A, is a first part of a flowchart illustrating the steps of an exemplary method of operating an interactive system in accordance with an exemplary embodiment.

DETAILED DESCRIPTION

Figure 1:
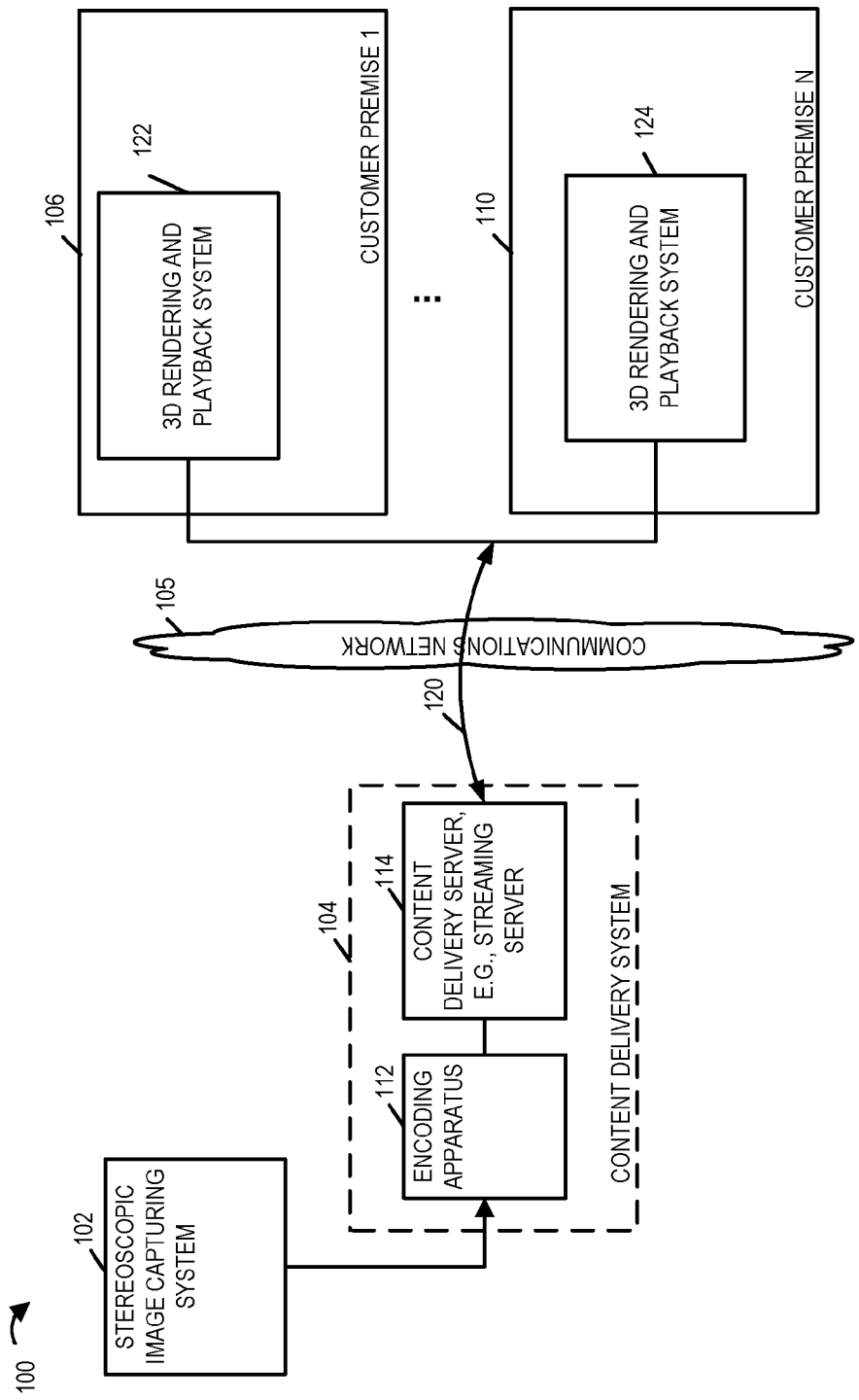
FIG. 1 illustrates an exemplary system implemented in accordance with some embodiments of the invention which can be used to capture and stream content for subsequent display by one or more user devices along with one or more synthesized portions of an environment.

FIG. 1 illustrates an exemplary system 100 implemented in accordance with some embodiments of the invention. The system 100 supports content delivery, e.g., imaging content delivery, to one or more customer devices, e.g., 3D capable playback devices located at customer premises. The system 100 includes the exemplary image capturing system 102, a content delivery system 104, a communications network 105, and a plurality of customer premises 106, . . . , 110. The image capturing system 102 supports capturing of stereoscopic imagery, e.g., using stereoscopic camera pairs as well as capturing of normal non-stereoscopic imagery. The image capturing system 102 captures and processes imaging content in accordance with the features of the invention and may include one or more cameras/stereoscopic camera pairs. The communications network 105 may be, e.g., a hybrid fiber-coaxial (HFC) network, satellite network, and/or internet.

The content delivery system 104 includes an encoding apparatus 112 and a content streaming device/server 114. The encoding apparatus 112 may, and in some embodiments does, include one or a plurality of encoders for encoding image data. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as indicated in the figure by the link 120 traversing the communications network 105. While the encoding apparatus 112 and content delivery server are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include one or more devices/systems, e.g., devices capable of decoding, rendering, playback and display of the imaging content streamed by the content streaming device 114. Customer premise 1 106 includes a 3D rendering and playback system 122 while customer premise N 110 includes 3D rendering and playback system 124. In some embodiments the 3D rendering and playback systems 122, 124 are capable of rendering and displaying 3D imaging content in accordance with the invention.

In various embodiments the 3D rendering and playback systems 122, 124 may decode the imaging content received from the content delivery system 104, generate imaging content using the decoded content, and render the imaging content, e.g., 3D image content, on a display e.g., a stereoscopic display. In various embodiments the 3D rendering and playback systems 122, 124 are capable of performing additional processing, e.g., performing zooming and masking operations in accordance with the features of the invention.

Figure 2:
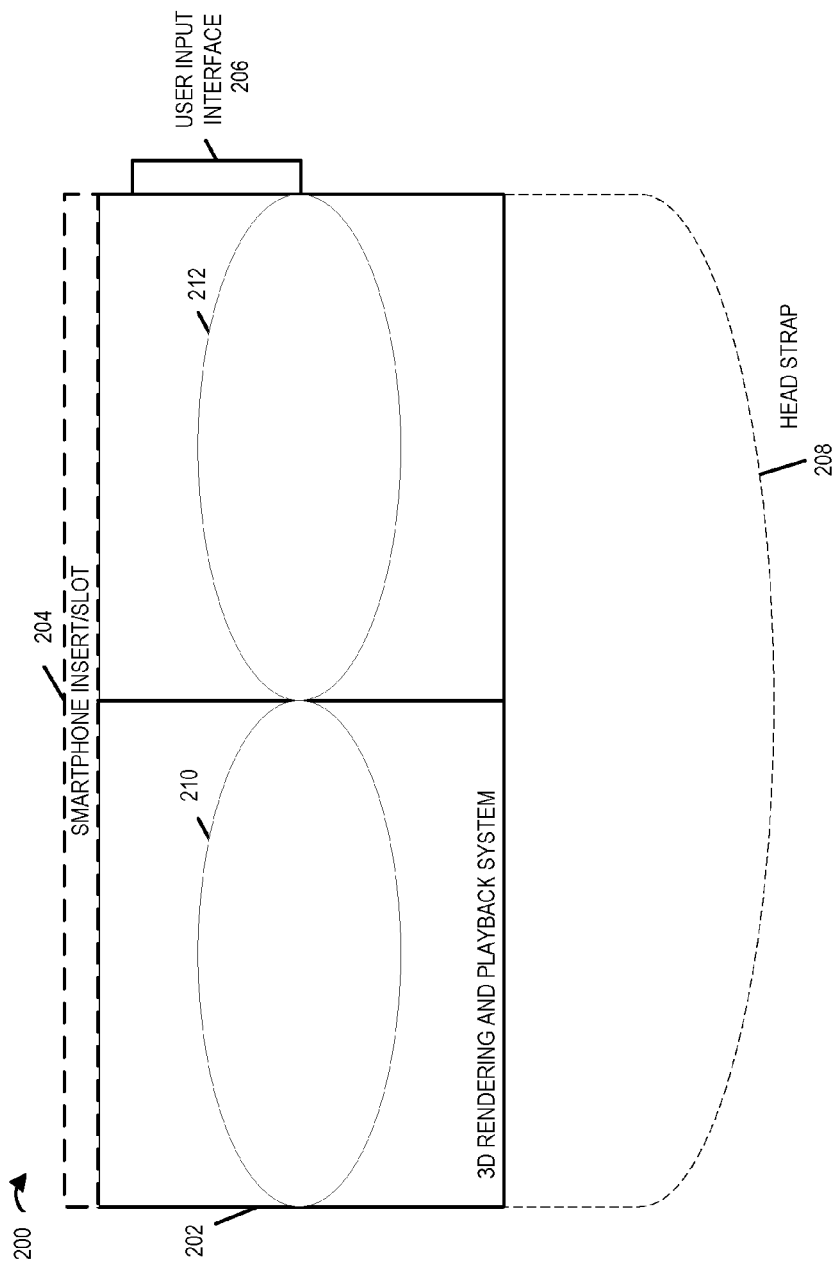
FIG. 2 illustrates an exemplary rendering and playback system, e.g., 3D rendering and playback system, implemented in accordance with one exemplary embodiment of the invention.

FIG. 2 illustrates an exemplary 3D rendering and playback system 200 implemented in accordance with one exemplary embodiment of the invention. The exemplary 3D rendering and playback system 200 may be used to display content captured by one or more cameras of the imaging system 102 and streamed by the content delivery system 104 to a user, e.g., a customer corresponding to customer premises 106, 110, in accordance with one exemplary embodiment. The exemplary 3D rendering and playback system 200 may be used as any of the 3D rendering and playback systems shown in FIG. 1. FIG. 2 shows a rear view of the 3D rendering and playback system 200 from the perspective of a user as if the user is going to wear, e.g., head mount, the rendering and playback system 200. Thus the illustrated view in FIG. 2 shows at least some elements that may be visible from the rear, e.g., looking into the rendering system 200 from the rear. The exemplary 3D rendering and playback system 200 includes a head mounted display assembly 202, a Smartphone insert/slot 204, a user input interface 206, a pair of lenses 210, 212 and a head strap 208.

Via the Smartphone insert/slot 204, a Smartphone can be inserted in the head mounted display assembly 202 of the system 200 thereby allowing the Smartphone display to become the display of the system 200. Once inserted in the slot 204 the Smartphone can communicate and exchange signaling with the head mounted display assembly 202. The Smartphone insert/slot 204 is shown as a dashed rectangular box to indicate the location of the slot 204 in the top portion of the rendering and playback system 200. The Smartphone serves as both the rendering and playback device, e.g., performing processing, rendering, playback and various operations for the system 200, and as the display device of the system 200 with the Smartphone screen serving as the display screen of the system 200. When mounted by a user, the user can view a displayed scene, e.g., a simulated 3D environment including content corresponding to a scene, through the lenses 210, 212. The simulated 3D environment displayed to the user allows for a real life 3D experience as if the user is actually present in the simulated environment.

Via the user input interface 206 user input is detected and actions are taken by the rendering and playback system 200. For example in some embodiments a user input via the interface 206 may indicate activation of a zoom mode of operation during which a displayed scene is zoomed in accordance with the features of the invention. In some embodiments the user input interface 106 includes a touchpad over which the user can move his fingers and a corresponding pointer, visible to the user on the display screen, moves along allowing the user to interact with objects displayed on the screen. In such embodiments the user may control the pointer to interact, e.g., select, move, delete etc., with icons and/or objects displayed on the screen. For example in some embodiments via the interface 206 the user may drag a pointer to a displayed portion of scene and select an area of the scene portion, e.g., by tapping on the touchpad of interface 106 and/or using a area select area, for zooming-in to the selected area. As a result of such a zoom-in operation, an enlarged version of the selected area is displayed in some embodiments as if viewing through binoculars while the remaining scene area is masked. In some embodiments in the zoom mode of display the mask is visible over the scene area portion outside of the scene area portion selected to be zoomed. In normal mode of display the entire scene area is displayed without the mask.

Figure 3:
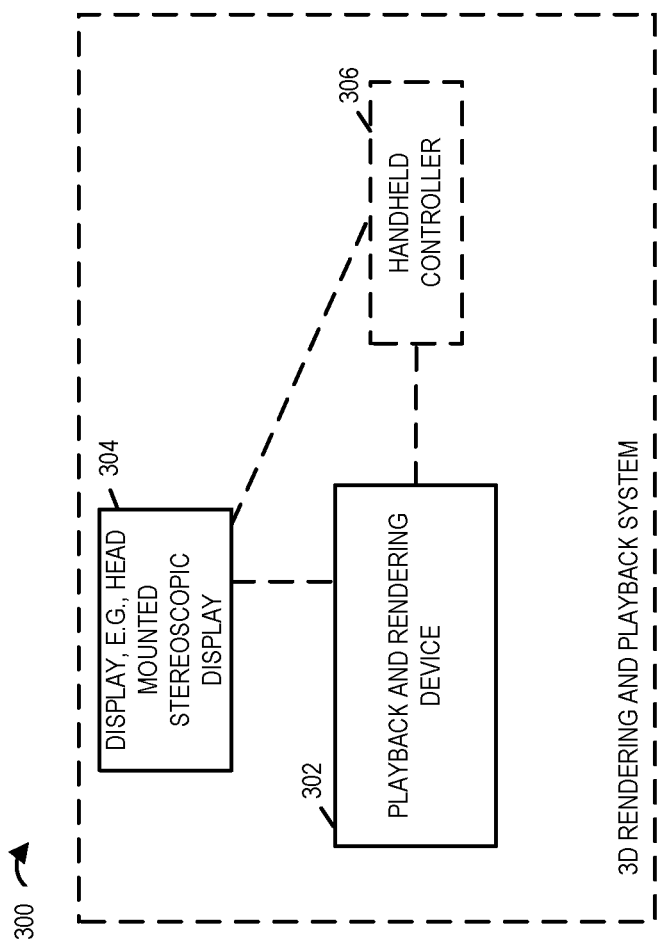
FIG. 3 illustrates another exemplary 3D rendering and playback system implemented in accordance with some other embodiments of the invention.

FIG. 3 illustrates another exemplary rendering and playback system 300 implemented in accordance with some other embodiments of the invention. The rendering and playback system 300 supports 3D rendering and display. The rendering and playback system 300 may be used as any of the exemplary rendering and playback systems shown in FIG. 1. The rendering and playback system 300 maybe used to implement the methods of the present invention. The exemplary 3D rendering and playback system 300 includes a playback and rendering device 302, e.g., a gaming console such as PS3, PS4 or other play station version, an Xbox version etc. In addition the rendering and playback system 300 further includes a stereoscopic display 304, and optionally a handheld controller 306. The elements 302, 304 and 306 of the system 300 may be wired and/or wirelessly connected (e.g., dashed lines indicating wired and/or wirelessly links). The display 304 in some embodiments is a head mounted stereoscopic display while in some other embodiments the display 304 may be another display device capable of displaying stereoscopic imaging content. In some embodiments the head mounted stereoscopic display 304 includes one or more sensors configured to track user's head movement and/or detect a change in user's head position. In some embodiments the playback and rendering device 202 includes one or more sensors, e.g., cameras, track user's head movement and/or detect a change in user's head position.

Figure 4:
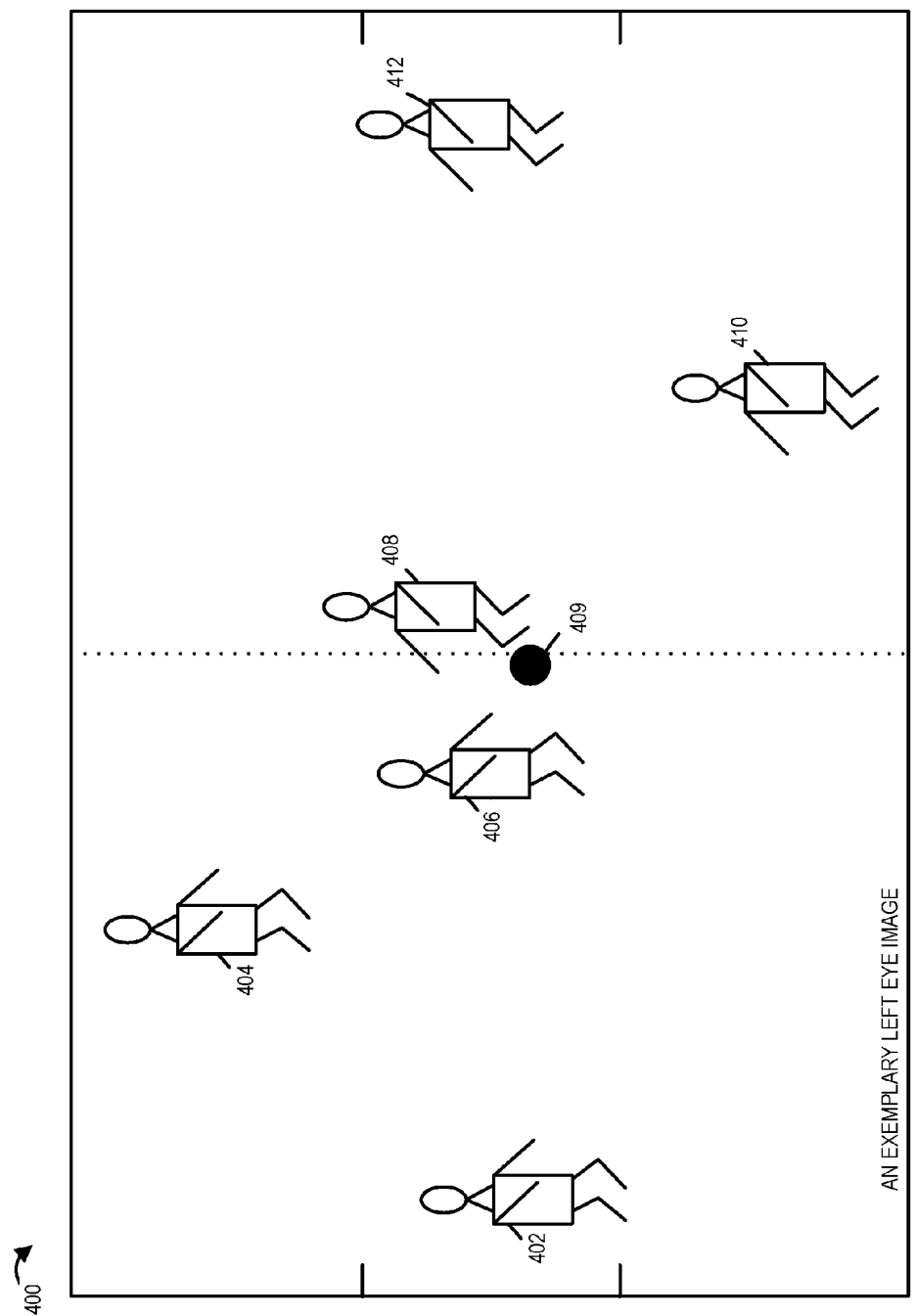
FIG. 4 illustrates an exemplary left eye image of a scene, e.g., captured by a left eye camera of a stereoscopic camera pair.

FIG. 4 illustrates an exemplary left eye image 400 of a scene, e.g., captured by a left eye camera of a stereoscopic camera pair, e.g., a stereoscopic camera pair used in the image capturing system 102.

Figure 5:
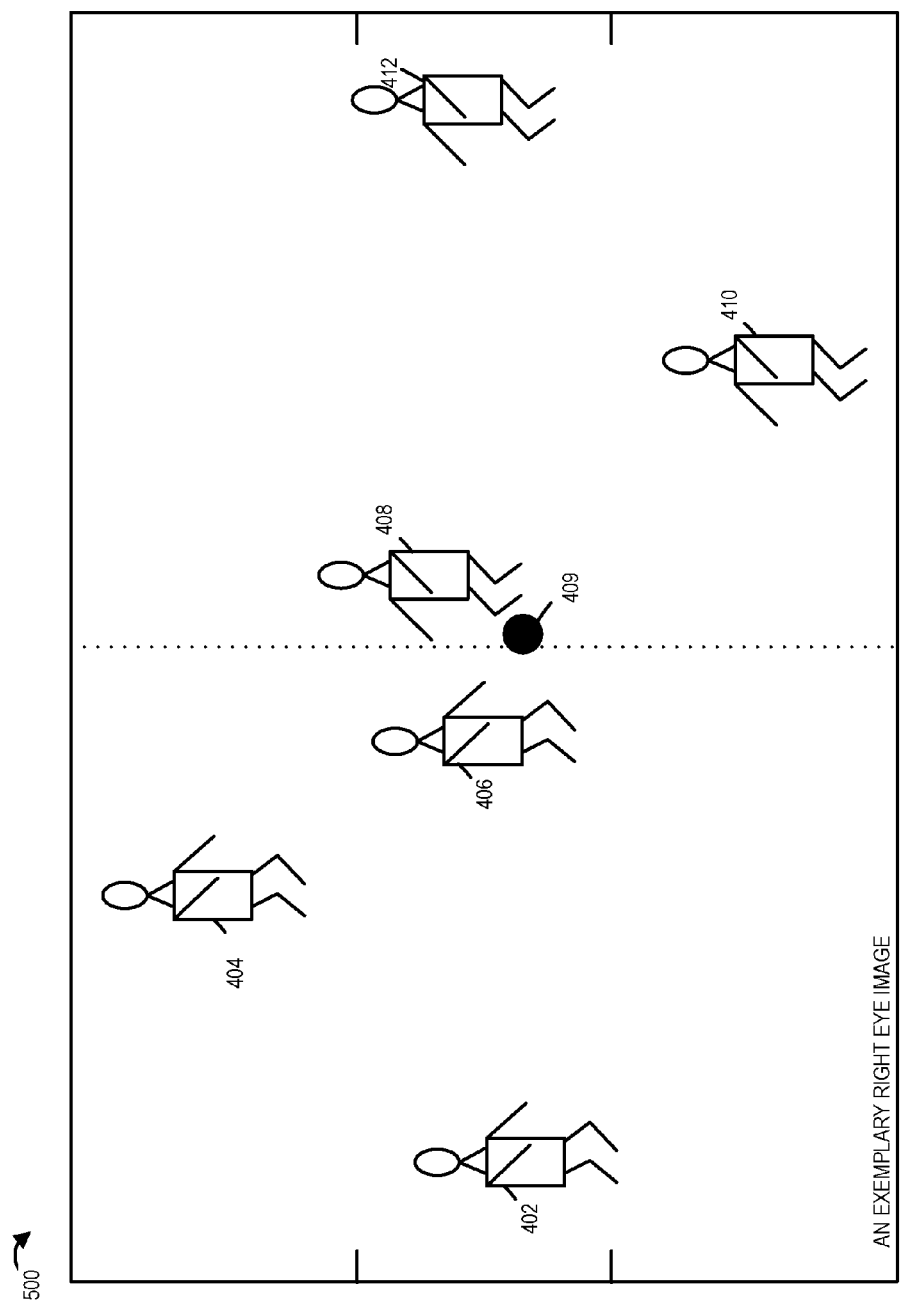
FIG. 5 illustrates an exemplary right eye image of the scene, e.g., captured by a right eye camera of a stereoscopic camera pair.

FIG. 5 illustrates an exemplary right eye image 500 of the scene, e.g., captured by a right eye camera of a stereoscopic camera pair. The dotted line through the center of the scene is shown in FIGS. 4-5 to illustrate that the left and right eye images are slightly offset with respect to each other since a left eye view and a right eye view are normally offset with respect to each other. In various embodiments left and right eye image pairs are transmitted to customer devices for rendering and display.

Figure 6:
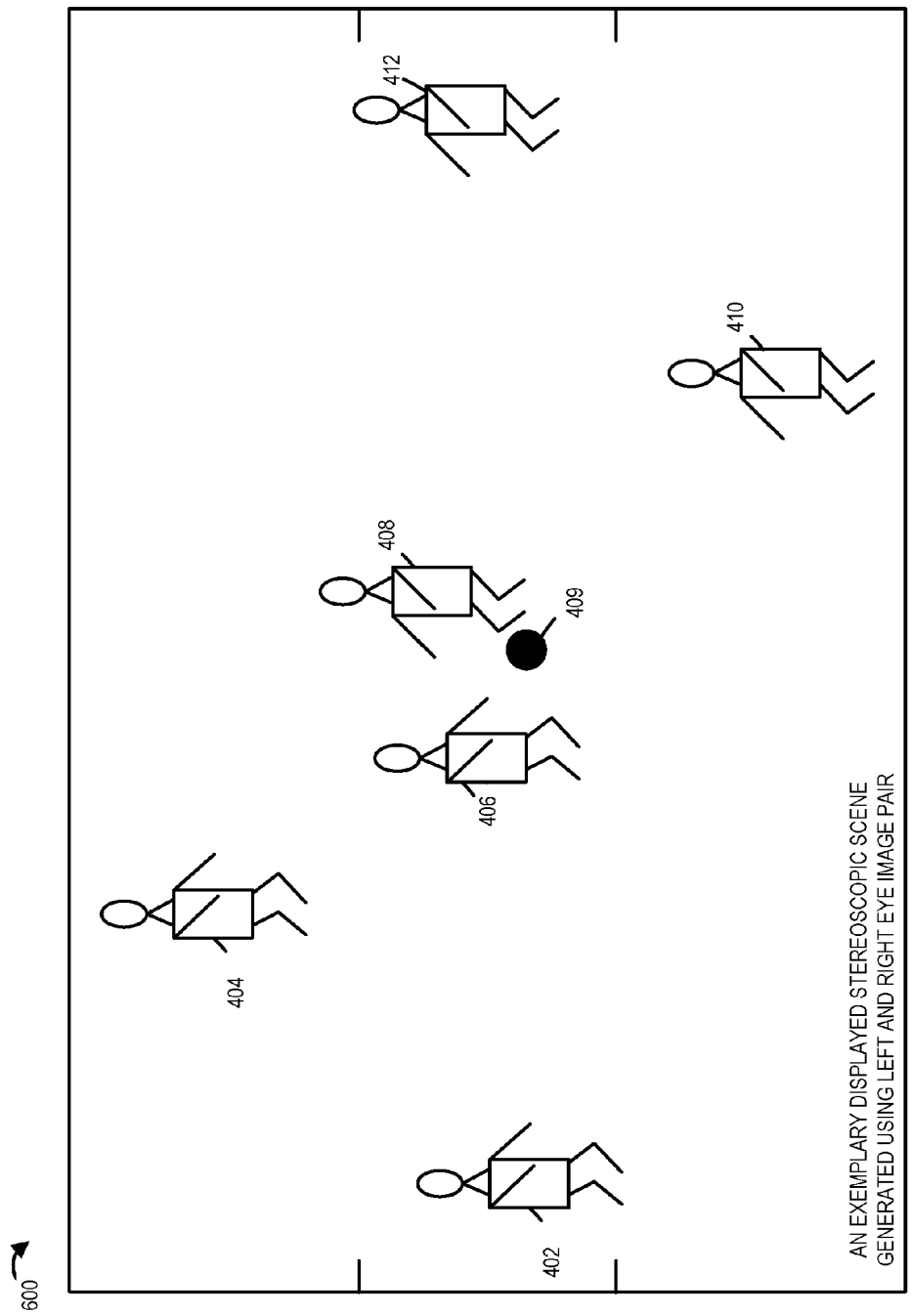
FIG. 6 illustrates an exemplary displayed stereoscopic scene generated using the left and right eye image pair of FIGS. 4-5, in accordance with some embodiments of the invention.

FIG. 6 illustrates an exemplary displayed stereoscopic scene 600 generated using the left and right eye image pair of FIGS. 4-5, in accordance with some embodiments of the invention. The stereoscopic scene 600 normally is the result of combining images captured from multiple cameras, e.g., at least a stereoscopic camera pair including a left eye camera and a right eye camera, and is displayed during a normal mode of display (non-zoom mode of operation). The stereoscopic scene 600 is generated by a rendering and playback device, e.g., system 122, 124, using received left and right eye images 400 and 500, and displayed to the user.

Figure 7:
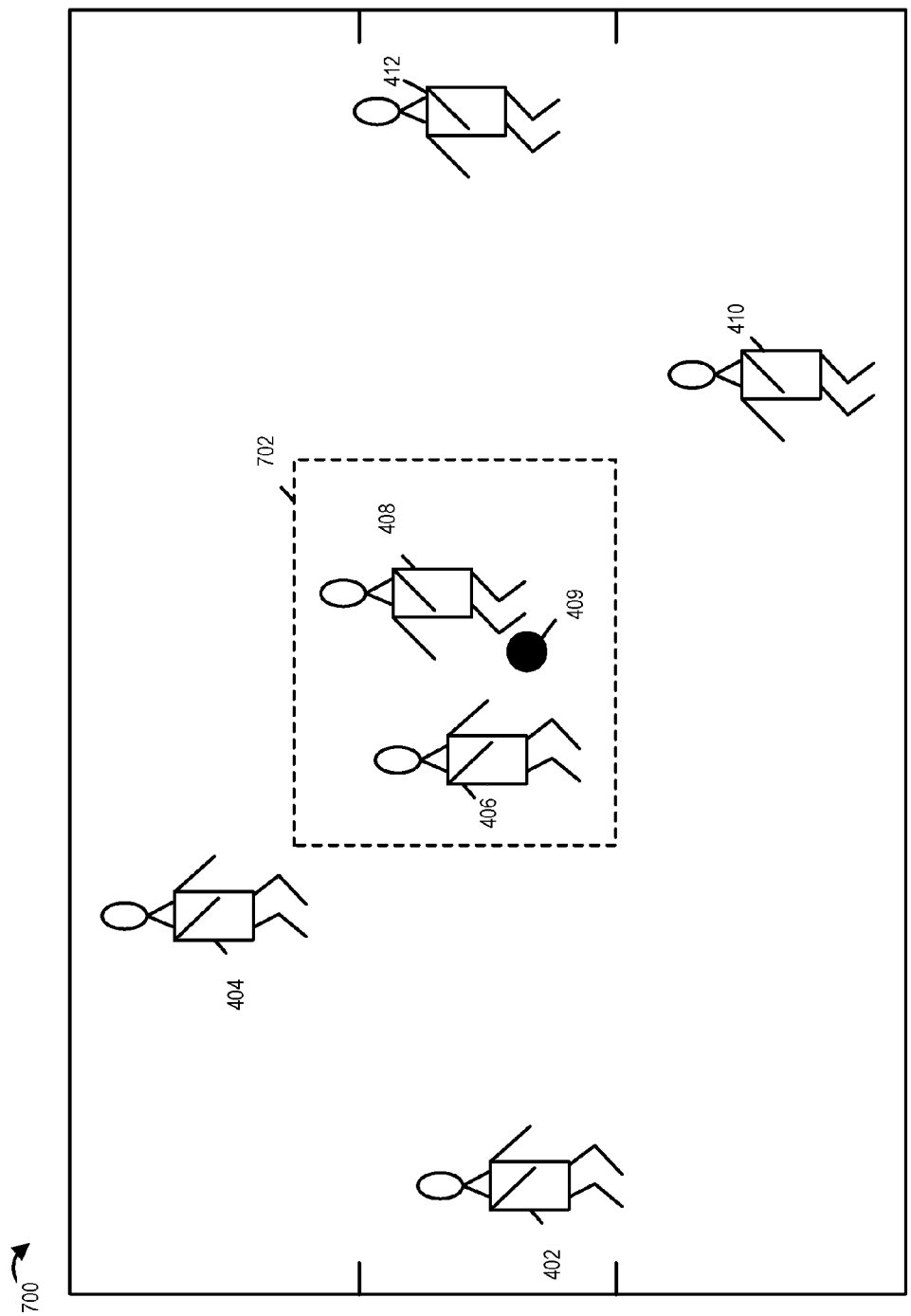
FIG. 7 illustrates a drawing showing the exemplary displayed stereoscopic scene of FIG. 6 with a portion of the displayed stereoscopic scene in the center being shown in a rectangle to indicate the scene portion that is zoomed, e.g., enlarged, in response to a user input indicating a zoom mode of operation, in accordance with some embodiments of the invention.

FIG. 7 illustrates a drawing 700 showing the exemplary displayed stereoscopic scene 600 of FIG. 6 with a portion of the displayed stereoscopic scene in the center being shown in a rectangle 702 to indicate the scene portion that is selected by a user, e.g., for zooming in. The user may select the scene area portion 702 in a variety of ways. The user may select the scene area portion 702 while a simulated 3D environment including scene 600 content is displayed in a variety of ways. For example in some embodiments the scene area portion 702 can be selected by the user by facing towards and looking at a scene area corresponding to portion 702 and selecting a zoom-in operation via the interface 206, e.g., by double tapping on the input interface 206 to activate zoom-in function. This is possible since user's head position and/or orientation is monitored and may be used in determining a scene area portion in the displayed 3D environment at which the user is looking at a given time. In some other embodiments an area selection tool is provided in the displayed 3D environment which can be used to manually select a scene area portion that the user may wish to zoom, e.g., draw out a rectangle (e.g., such as rectangle 702) around the scene area portion to be zoomed. In some embodiments when the user does not specifically select a scene area portion to be zoomed but simply provides an input to zoom-in (e.g., by double tapping or pinch-spread action on the interface 206) then the scene area portion where action occurs, e.g., center of stage, field and/or other performance area, in a displayed scene area is zoomed.

FIG. 8 illustrates a stereoscopic scene area 800 displayed during the zoom mode of display which is displayed to the viewer after a zooming and masking operation has been applied, with a displayed portion of the scene area 800 presenting a simulated viewing of the portion of the scene 600 through binoculars. The scene area 800 is a portion of the displayed scene 600 that results from the zooming and masking operations performed on left and right eye images corresponding to the scene 600. The scene portion 804 corresponds to the scene portion of interest that is zoomed, e.g., in response to user selection. The zoomed scene portion 804 displayed to the user corresponds to the scene area portion included in the rectangle 702 of FIG. 7. As can be appreciated from FIG. 8 the displayed scene portion 804 presents a simulated viewing of the user selected scene area through binoculars, e.g., with the displayed left and right circles indicating simulated binocular view and the inside visible scene area being the zoomed version of user selected area. The masked portion 802 of the scene area 800 is shown using diagonal line pattern, e.g., to represent the mask. In the zoom mode of display the mask is visible to the user covering the area outside the enlarged area of interest 804. While the mask pattern is displayed to the user the actual portion of the scene 600 under the mask which is outside the zoomed/enlarged scene portion 804 is not visible to the user because of being blocked by the mask thereby simulating a viewing constraint corresponding to viewing through binoculars. Thus when the zoom mode is activated the user's view is restricted, to a portion of the displayed scene that the user might expect to see if looking through binoculars. However in normal mode of display the mask is not visible since there is no masking operation on the scene area portion prior to display.

Figure 9B:
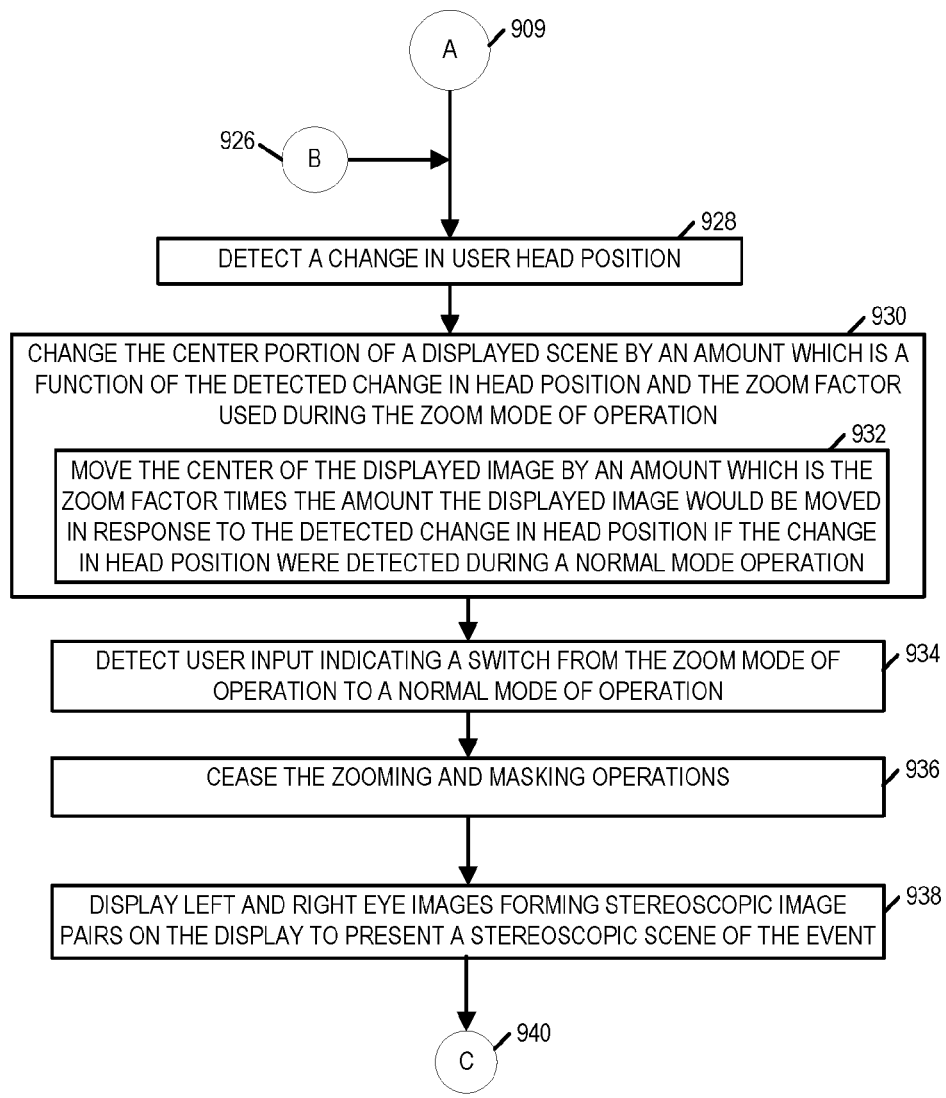
FIG. 9B is a second part of the flowchart illustrating the steps of the exemplary method of operating an interactive system in accordance with the invention, with FIG. 9 comprising a combination of FIGS. 9A and 9B.

FIG. 9, which comprises a combination of FIGS. 9A and 9B, is a flowchart illustrating the steps of an exemplary method of operating an interactive system, e.g., rendering and playback system, in accordance with an exemplary embodiment. The method of flowchart 900 is implemented in some embodiments using the interactive system of the present invention, e.g., 3D rendering and playback system of FIGS. 2-3.

The method starts in step 902, e.g., with the rendering and playback being powered on and initialized. The method proceeds from start step 902 to steps 904, 906 and 908 which may be performed asynchronously in parallel. In step 904 monitoring for user input begins at the interactive system. The monitoring for user input is performed on an ongoing basis as indicated by the loopback. Operation proceeds from step 904 to step 910.

In step 906 a scene of an event is displayed on a display, e.g., stereoscopic display, which may be a part of the 3D rendering and playback system. In various embodiments step 906 includes performing step 907 wherein stereoscopic image pairs are displayed on the display to provide a 3D presentation of the scene, each stereoscopic image pair including a left eye view and a right eye view. Operation proceeds from step 904 to step 910.

In step 908 monitoring for user head position and/or head orientation begins at the interactive system, e.g., to track any changes to user head orientation relative to a nominal orientation. In some embodiments during initialization prior to or as part of step 908 the user's current head position is detected. The user, aware that the head position detected during the initialization phase will be assumed to be a forward looking position, normally maintains his head at a comfortable level forward facing position during step 908, e.g., normally look directly at the scene of interest in a displayed 3D environment. The user's head position detected during initialization is considered as the reference head position and changes in head orientation relative to the reference position are tracked. The monitoring for user head position is performed on an ongoing basis. Operation proceeds from step 908 to the next processing step, e.g., upon the monitoring detecting a change in head position. In some embodiments operation proceeds from 908 to step 928 via connecting node A 909.

Returning to step 910. In step 910 a user input indicating a zoom mode of operation is detected, e.g., input indicating activation of a zoom mode. The user input in some embodiments is detected on a user input interface of a rendering and playback device such as the one illustrated in FIGS. 2 and 3 and/or via another interface capable of detecting user input, e.g., via control signals received from a control device. In some embodiments the user input interface is a touch sensitive sensor while in some other embodiments it may be a button which can be depressed to indicate activation of zoom mode. In some embodiments step 910 includes step 912 in which user input indicating a zoom factor to be used during the zoom mode of operation is detected, e.g., as part of the input indicating a zoom mode of operation. Operation proceeds from step 910 to step 914.

In step 914 the system simulates viewing of a portion of the scene through binoculars in response to receiving user input indicating that a zoom mode of operation is activated. In various embodiments as part of implementing step 914, steps 916, 917, 918 and 919 are performed. In step 916 a zoom operation is performed on a first left eye image, e.g., left eye camera image corresponding to the scene. Next in step 917 a mask is applied to the zoomed first left eye image simulating a viewing constraint corresponding to viewing through binoculars to generate a masked zoomed left eye image. As a result of step 916 a masked zoomed left eye image is generated. In step 918 a zoom operation is performed on a first right eye image, e.g., right eye camera image corresponding to the first left eye image. Next in step 919 a mask is applied to the zoomed first right eye image simulating a viewing constraint corresponding to viewing through binoculars to generate a masked zoomed right eye image.

Operation proceeds from step 914 to step 920. In step 920, masked zoomed stereoscopic image pairs including the masked zoomed left and right eye images are displayed on the stereoscopic display to present a stereoscopic presentation of the portion of the scene through binoculars, e.g., such as the one shown in FIG. 8.

Operation proceeds from step 920 to step 922. In step 922, masking and zooming operations are performed on additional left and right eye images to generate additional masked zoomed stereoscopic image pairs while the system is in the zoom mode of operation and displaying images in a frame or sequence of frames corresponding to the scene, e.g., with the zoom level being based on the user input indicating the zoom factor.

Operation proceeds from step 922 to step 924. In step 924, masked zoomed additional stereoscopic image pairs including the masked zoomed additional left and right eye images are displayed on the stereoscopic display for a period of time in which the system is in the zoom mode of operation. Operation proceeds from step 924 to step 928 via connecting node B 926.

Referring now to step 928. In step 928 a change is detected in user head orientation, e.g., head position, e.g., due to the user moving his head due to change in the direction of gaze for example. Operation proceeds from step 928 to step 930. In step 930, in response to detecting a change in the user head position, the center portion of a displayed scene, e.g., comprising of the left and right images used to generate the stereoscopic scene, is changed by an amount which is a function of the detected change in head position and a zoom factor used during said zoom mode of operation. In some embodiments changing the center portion of the displayed scene by an amount which is a function of the detected change in head position and the zoom factor in step 930 includes moving the center of the displayed scene by an amount which is the zoom factor times the amount the displayed image would be moved in response to the detected change position if the change in head position were detected during normal mode operation which is implemented in sub-step step 932.

Operation proceeds from step 930 to step 934. In step 934, a user input indicating a switch from the zoom mode of operation to a normal mode of operation is detected. Operation proceeds from step 934 to step 936. In step 936, in response to the user input indicating a switch from the zoom mode of operation to a normal mode of operation, the zooming and masking operation on the images is ceased. Operation proceeds from step 936 to step 938. In step 938 left and right eye images forming stereoscopic image pairs are displayed on the display to present a stereoscopic scene of the event, e.g., as part of the operation during the normal mode. In various embodiments the operation continues and various steps of the method may be repeated.

Figure 10:
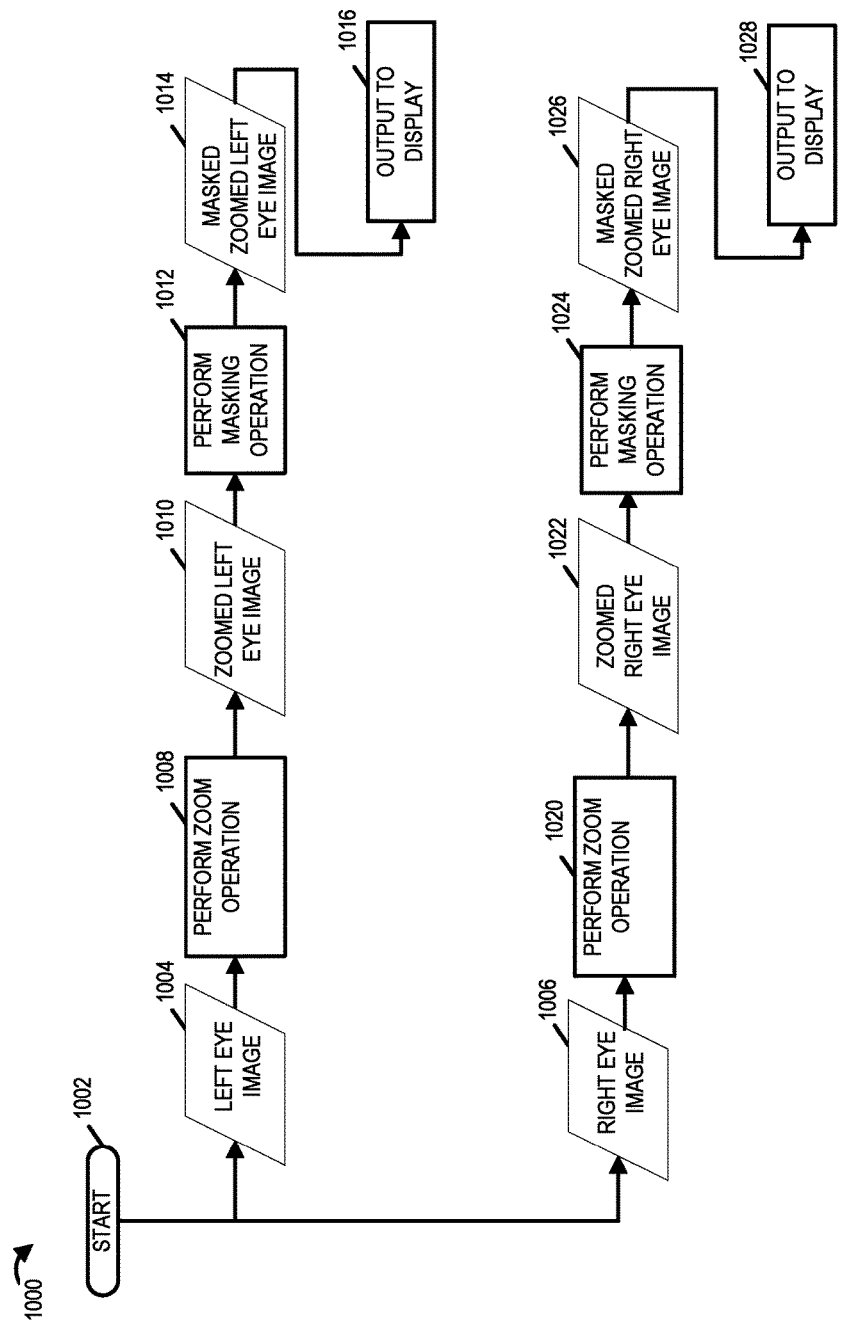
FIG. 10 illustrates exemplary processing performed as part of performing zooming and masking operations, in accordance with some embodiments of the invention.

FIG. 10 illustrates exemplary processing 1000 performed as part of performing zooming and masking operations, in accordance with some embodiments of the invention. FIG. 10 illustrates an example showing how input left and right eye images 1004, 1006 are subjected to zooming and masking operation prior to masked zoomed left and right eye images being output to a display. The processing begins in step 1002 with the left and right eye images 1004, 1006 being received. In steps 1008 and 1020, a zooming operation is performed on the left and right eye images 1004, 1006 respectively producing zoomed left eye image 1010 and zoomed right eye image 1022.

Next the zoomed left and right eye images 1010, 1022 are each subjected to a masking operation in steps 1012 and 1024 respectively. The masking operations in steps 1012 and 1024 produce masked zoomed left eye image 1014 and masked zoomed right eye image 1026 respectively. In various embodiments the masking operation simulates a viewing constraint corresponding to viewing through binoculars, e.g., for example as if the zoomed left and right eye images are being viewed through a binocular over the eyes of the user.

Next the masked zoomed stereoscopic image pairs including the masked zoomed left and right eye images 1014, 1026 are output, e.g., displayed on a stereoscopic display, in steps 1016 and 1028.

Figure 11:
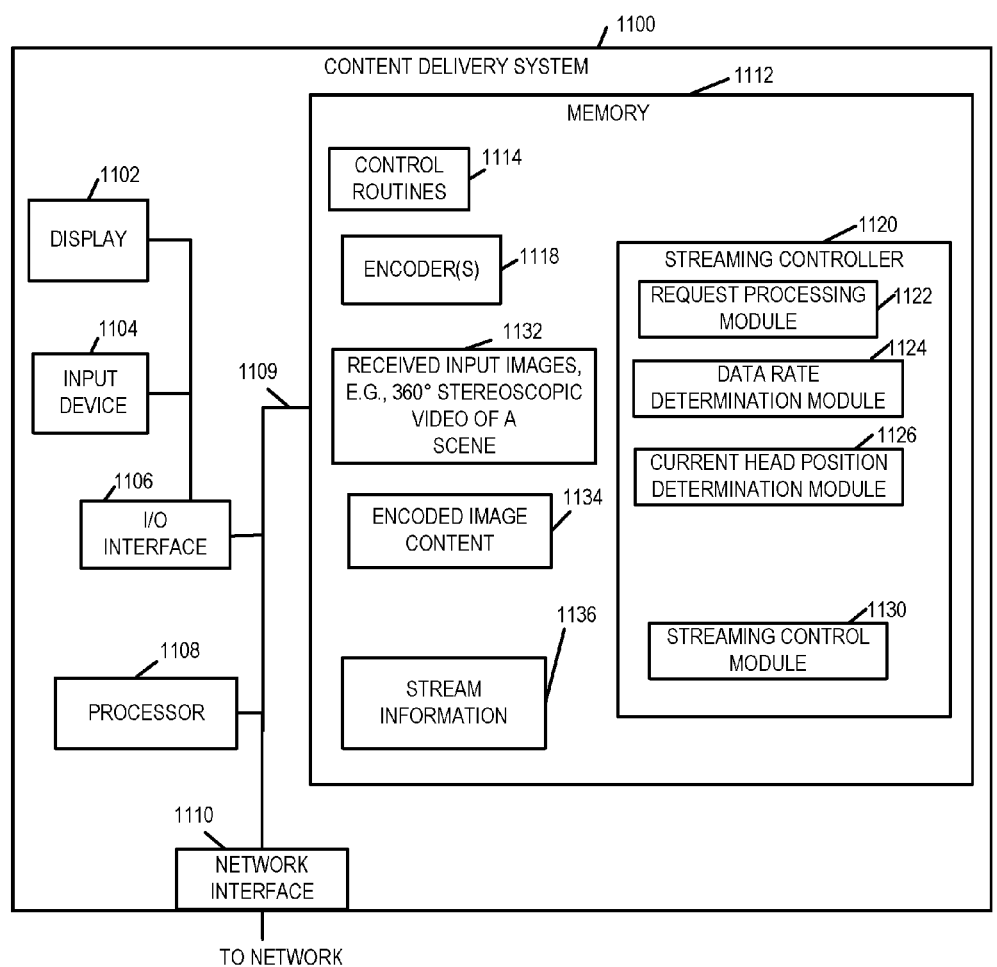
FIG. 11 illustrates an exemplary content delivery system that can be used to encode and stream content in accordance with the features of the invention.

FIG. 11 illustrates an exemplary content delivery system 1100 that can be used to encode and stream content in accordance with the features of the invention.

The system 1100 may be used to perform encoding, storage, and transmission and/or content output in accordance with the features of the invention. The content delivery system 1100 may be used as the system 104 of FIG. 1. While the system shown in FIG. 11 is used for encoding, processing and streaming of content, it should be appreciated that the system 1100 may also include the ability to decode and display processed and/or encoded image data, e.g., to an operator.

The system 1100 includes a display 1102, input device 1104, input/output (I/O) interface 1106, a processor 1108, network interface 1110 and a memory 1112. The various components of the system 1100 are coupled together via bus 1109 which allows for data to be communicated between the components of the system 1100.

The memory 1112 includes various modules, e.g., routines, which when executed by the processor 1108 control the system 1100 to implement the encoding, storage, and streaming/transmission and/or output operations in accordance with the invention.

The memory 1112 includes various modules, e.g., routines, which when executed by the processor 1108 control the computer system 1100 to implement stereoscopic video acquisition, encoding, storage, and transmission and/or output methods in accordance with the invention. The memory 1112 includes control routines 1114, encoder(s) 1118, a streaming controller 1120, received input images 1132, e.g., 360 degree stereoscopic content of a scene, encoded image content 1134, and timing information 1136. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The encoder(s) 1118 may, and in some embodiments do, include a plurality of encoders configured to encode received image content, e.g., 360 degree version of a scene and/or one or more scene portions. In some embodiments encoder(s) include multiple encoders with each encoder being configured to encode a stereoscopic scene and/or partitioned scene portions to support a given bit rate stream. In some embodiments each scene portion can be encoded using multiple encoders to support multiple different bit rate streams for each scene. An output of the encoder(s) 1118 is the encoded image content 1134 which is stored in the memory for streaming to customer devices, e.g., playback devices. The encoded content can be streamed to one or multiple different devices via the network interface 1110.

The streaming controller 1120 is configured to control streaming of encoded content for delivering the encoded image content to one or more customer devices, e.g., over the communications network 105. The streaming controller 1120 includes a request processing module 1122, a data rate determination module 1124, a current head position determination module 1126, a selection module 1128 and a streaming control module 1130. The request processing module 1122 is configured to process a received request for imaging content from a customer playback device. The request for content is received in various embodiments via a receiver in the network interface 1110. In some embodiments the request for content includes information indicating the identity of requesting playback device. In some embodiments the request for content may include data rate supported by the customer playback device, a current head position of the user, e.g., position of the head mounted display. The request processing module 1122 processes the received request and provides retrieved information to other elements of the streaming controller 1120 to take further actions. While the request for content may include data rate information and current head position information, in various embodiments the data rate supported by the playback device can be determined from network tests and other network information exchange between the system 1100 and the playback device. While in some embodiments some customer rendering and playback systems may request content streams based on determined head orientation of the user at the given time, e.g., to allow the user to view the environment accordingly, in many cases the customer rendering and playback systems may not specifically request a content stream but rather simply attach to a broadcast content stream among a plurality of content streams broadcast by the content delivery system 1100. In some embodiments the content delivery system 1100 broadcasts different content streams corresponding to different portions of the 360 degree scene environment allowing the rendering and playback system to attach to one or more content streams based on the viewer's current head orientation at a given time.

The data rate determination module 1124 is configured to determine the available data rates that can be used to stream imaging content to customer devices, e.g., since multiple encoded scene portions are supported the content delivery system 1100 can support streaming content at multiple data rates to the customer device. The data rate determination module 1124 is further configured to determine the data rate supported by a playback device requesting content from system 1100. In some embodiments the data rate determination module 1124 is configured to determine available data rate for delivery of image content based on network measurements.

The current head position determination module 1126 is configured to determine a current viewing angle and/or a current head position of the user, e.g., orientation of the head mounted display, from information received from the customer rendering and playback device.

The streaming control module 1130 is configured to control streaming of image content, e.g., multiple portions of a 360 degree stereoscopic scene, at various supported data rates in accordance with the features of the invention.

The stream information 1136 in some embodiments is communicated to customer rendering and playback systems as part of guide information, e.g., electronic program guide, providing information on content streams that a rendering and playback system may select to receive. The stream information 1136 can be used by customer devices to access the content streams available from the content delivery system 1100 for delivery to customer devices. In some embodiments the stream information 1136 includes, for a plurality of available content streams, one of a multicast address of a multicast group which can be joined to receive a given corresponding content stream, information which can be used to request access to a switched digital video channel used to provide a given content stream, or channel tuning information which can be used to control a tuner of the playback system to tune to a broadcast channel on which a given content stream is broadcast.

Figure 12:
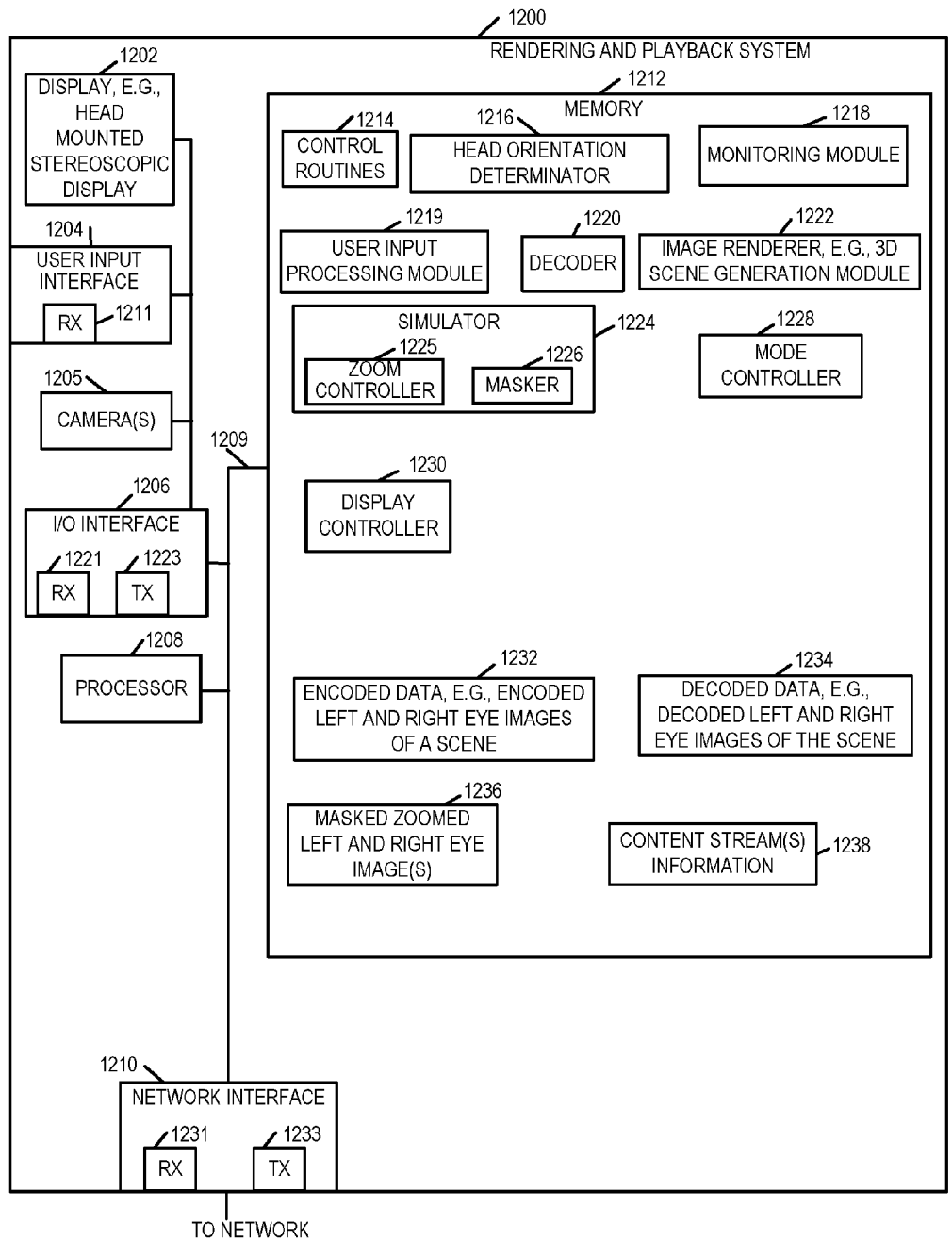
FIG. 12 illustrates an exemplary rendering and playback system that can be used to receive, decode and display the content streamed by the system of FIG. 11.

FIG. 12 illustrates an exemplary rendering and playback system 1200 that can be used to receive, decode and display the content streamed by the system of FIG. 11. The exemplary rendering and playback system 1200 can be used to receive, decode, store and display imaging content received from a content delivery system such as the one shown in FIGS. 1 and 11. The exemplary rendering and playback system 1200 may be used as any of the rendering and playback systems shown in FIGS. 1-3. The rendering and playback system 1200 in some embodiments include and/or coupled to 3D head mounted display 1202. The system 1200 includes the ability to decode the received encoded image data and generate 3D image content for display to the customer. The rendering and playback system 1200 in some embodiments is located at a customer premise location such as a home or office but may be located at an image capture site as well. The rendering and playback system 1200 can perform signal reception, decoding, zooming, masking, display and/or other operations in accordance with the invention.

The rendering and playback system 1200 includes a display 1202, a user input interface device 1204, camera(s) 1205, input/output (I/O) interface 1206, a processor 1208, network interface 1210 and a memory 1212. The various components of the rendering and playback system 1200 are coupled together via bus 1209 which allows for data to be communicated between the components of the system 1200. The rendering and playback system 1200 includes the head mounted 3D display 1202 on which the image content is presented, e.g., with left and right eyes of a user being presented with different images in the case of stereoscopic content. By displaying different images to the left and right eyes on a single screen, e.g., on different portions of the single screen to different eyes, a single display can be used to display left and right eye images which will be perceived separately by the viewers left and right eyes. In some embodiments the playback and rendering system 1200 is used as the playback and rendering system 200 and a cell phone/Smartphone screen is used as the display 1202. In some other embodiments the playback and rendering system 1200 is used as the playback and rendering system 300. The head mounted display 1202 maybe implemented using the OCULUS RIFT™ VR (virtual reality) headset which may include the head mounted display 1202. Other head mounted displays may also be used. In a case where a cell phone, e.g., Smartphone, processor is used as the processor 1208 and the cell phone generates and displays images in a head mount assembly (such as head mount 102), the system 1200 may include as part of the head mount device the processor 1208, display 1202, camera(s) 1205 and memory 1212. The processor 1208, display 1202 and memory 1212 may all be part of the cell phone. In other embodiments of the system 1200, the processor 1208 may be part of a gaming system such as an XBOX, PS3, PS4 etc., with the display 1202 being mounted in a head mounting device and coupled to the gaming system. Whether the processor 1208 or memory 1212 are located in the device which is worn on the head or not is not critical and, as can be appreciated, while in some cases it may be convenient to collocate the processor in the headgear, from a power, heat and weight perspective it can be desirable to in at least some cases to have the processor 1208 and memory coupled to the head gear which includes the display. While various embodiments contemplate a head mounted display 1202, the methods and system can also be used with non-head mounted displays which can support 3D image.

Thus the display device 1202 is configured to display to display images corresponding to a scene. In some embodiments as part of being configured to display images corresponding to a scene the display device is configured to output stereoscopic image pairs, e.g., left and right eye images, to provide a 3D presentation of the scene. The scene may correspond to an event. Each stereoscopic image pair includes a left eye view and a right eye view, e.g., captured by left and right eye cameras in a stereoscopic camera system.

The operator/user of the playback and rendering system 1200 may control one or more parameters, input information, commands etc., via the user input interface 1204 and/or select operations to be performed, e.g., select zoom mode of operation, provide zoom factor to be used and/or select a scene area portion to be zoomed. Via the user input interface 1204 a user may further provide input to the rendering and playback system 1200, e.g., input indicating a user selected switch from a normal mode to zoom mode or vice versa. The user input interface 1204 may include, for example, a keyboard, keypad, touchpad and/or touch sensitive screen. The user input interface 1204 includes a receiver 1211 via which the rendering and playback system 1200 receives the information/data provided by the user. The user may use the user input interface 1204 to make a selection of item and/or respond to a displayed prompt and/or other indication requiring user's input. The user input may be provided e.g., by a single tap, double tap, pinch and spread action or some other action on the input interface 1204.

The camera(s) 1205 includes one or more cameras which can be, and sometimes are, used to capture images, e.g., of persons, physical environment and/or objects in the physical environment where the system 1200 is located. In some embodiments where the system 1200 is used as the rendering and playback 200 the camera 1205 may be the camera device of the Smartphone being used in the system 200. In some embodiments where the system 1200 is used as the rendering and playback system 300 the camera 1205 may be the camera located on the rendering device 302 or on the head mounted display 304. In some embodiments the camera(s) 1205 can be used to track changes in head orientation and/or viewing angle of the user relative to a reference orientation, e.g., set during initialization.

Via the I/O interface 1206, the system 1200 can be coupled to external devices to exchange signals and/or information with other devices. In some embodiments via the I/O interface 1206 the system 1200 can receive information and/or images captured by external cameras and output information and/or images to external devices. The I/O interface 1206 includes a receiver (RX) 1221 and a transmitter (TX) 1223 via which the receiving and transmitting operations are performed. In some embodiments via the interface 1206 the system 1200 is coupled to an external controller, e.g., such as the handheld controller 306. In embodiments where a handheld controller 306 is available, the handheld controller 306 may be coupled to the I/O interface 1206 and used to enter information and/or provide user input of the types discussed above.

The processor 1208, e.g., a CPU, executes routines 1214 and uses the various modules to control the system 1200 to operate in accordance with the invention. The processor 1208 is responsible for controlling the overall general operation of the system 1200. In various embodiments the processor 1208 is configured to perform functions that have been discussed as being performed by the playback and rendering system 1200.

Via the network interface 1220 the system 1200 communicates and/or receives signals and/or information (e.g., including images and/or video content corresponding to a scene) to/from various external devices over a communications network, e.g., such as communications network 105. The network interface 1220 includes a receiver 1231 and a transmitter 1233 via which the receiving and transmitting operations are performed. In some embodiments the system receives one or more content streams, e.g., including left and right eye images in case of stereoscopic content, via the network interface 1220 from the content delivery system 104. The received content may be received as encoded data, e.g., encoded scene data 1242.

In some embodiments the memory 1212 includes various routines and/or modules which when executed by the processor 1208 control the rendering and playback system 1200 to perform operations in accordance with the invention. The memory 1212 includes control routines 1214, a head orientation and/or viewing angle determinator 1216, a head position monitoring module 1218, a user input processing module 1219, a decoder 1220, an image renderer 1222, a simulator 1224, a mode controller 1228, and a display controller 1230. The memory 1212 further includes data/information including encoded data 1242, decoded data 1244 and generated image content 1246.

The control routines 1214 include device control routines and communications routines to control the operation of the system 1200. The head orientation and/or viewing angle determinator 1216 is configured to determine a current head position of the user, e.g., orientation of the head mounted display, and in some embodiment report the determined position and/or viewing angle information to the content delivery system 1100. The head orientation determinator 1216 may be implemented using one or a combination of sensors to detect user's head orientation at a given time. In some embodiments the determined head orientation and/or change in orientation from a reference orientation is used in determining which portion of a displayed scene the user is viewing at a given time.

The monitoring module 1218 is configured monitor user head position to detect changes in the user's head orientation, e.g., due to rotation of head, tilting of the head or both rotation and tilting, from an initial/current head orientation. In some embodiments the monitoring module 1218 monitors for changes in the head orientation following the initial detection of user's head orientation and setting of the default/reference head orientation. The monitoring module 1218 is configured to detect changes in the head orientation relative to a currently set head orientation at a given time, e.g., default/reference head orientation initially detected by the head orientation determination module 1216. Thus if the user's head orientation changes from the initially detected head orientation, e.g., due to head rotation, tilt or both, the monitoring module 1218 receives an input from the head orientation determinator 1216 indicating a current head orientation and compares it against the currently set/previously detected head orientation of the user stored in memory 1212 to determine if there has been any changes in the head orientation. In some embodiments the monitoring module 1218 is further configured to determine the head angle of rotation and/or head tilt angle relative to the default head orientation, e.g., how much has the user rotated and/or tilted his/her head from a 0° position corresponding to the default/reference head orientation or an angle corresponding to the previously detected head orientation. In various embodiments such head angle of rotation and/or head tilt angle information is used to determine where, e.g., which scene portion, the user is looking at in a displayed scene. The user input processing module 1219 is further configured to process received user input, commands, instructions provided by the user via, e.g., the user input interface 1204 and/or I/O interface 1206. In some embodiments the user input processing module 1219 processes user control inputs and provide information and/or signaling to other elements of the rendering and playback system 1200 for controlling the operation in accordance with the invention.

The decoder module 1220 is configured to decode encoded image content 1232 received from the content delivery system to produce decoded image data 1234. The decoded image data 1234 may include decoded stereoscopic scene and/or decoded scene portions. The image renderer 1222 uses decoded image content (e.g., decoded data 1234 in normal mode of operation and masked zoomed image data 1236 in zoom mode of operation) including content corresponding to a scene to generate content for displaying to a user on the display 1202. The image renderer 1222 may be implemented as a 3D image generation module to render 3D stereoscopic image content.

The simulator 1224 is configured to simulate viewing of a portion of a displayed scene through binoculars in response to a user input (e.g., detected via the user interface 1204) indicating a zoom operation. In some embodiments the simulator 1224 is configured to, as part of being configured to simulate viewing of a portion of the scene through binoculars, to: perform a zoom operation on a first left eye image, and apply a mask to zoomed first left eye image simulating a viewing constraint corresponding to viewing through binoculars to generate a masked zoomed left eye image. The simulator 1224 in some embodiments is further configured to, as part of being configured to simulate viewing of a portion of the scene through binoculars, to: perform a zoom operation on a first right eye image corresponding to the first left eye image, and apply a mask to the zoomed right eye image simulating a viewing constraint corresponding to viewing through binoculars to generate a masked zoomed right eye image. In various embodiments the simulator 1224 includes a zoom controller 1225 and a masker 1226 which are configured to perform the above discussed zooming and masking operations respectively. The zoom controller 1225 and masker 1226 perform zooming and masking operations respectively on decoded left and eye images 1234 in accordance with the features of the invention when the zoom mode of operation is enabled to generate masked zoomed left and right eye images. In various embodiments the display device 1202 is configured to display the masked zoomed stereoscopic image pairs including masked zoomed left and right eye images to present the simulated viewing of the portion of the scene through binoculars. Thus in some embodiments when the system 1200 is in zoom mode of operation the display device 1202 display the masked zoomed left eye image and the masked zoomed right eye image while the masked zoomed left eye image is being displayed.

In some embodiments the user input interface 1204 includes a receiver 1211 configured to receive user input indicating a zoom factor to be used during the zoom mode of operation. In some embodiment while viewing the displayed scene the user changes his/her head position, e.g., rotating, tilting and/or or otherwise changing the direction of gaze. The head position monitoring module 1218 monitoring the user's head position detects a change in user head position and provides the detected change information to the display controller 1230 in some embodiments. The display controller 1230 is configured to change the center portion of a displayed scene by an amount which is a function of the detected change in head position and a zoom factor used during the zoom mode of operation. In some embodiments the display controller 1230 is configured to move the center of the displayed scene by an amount which is the zoom factor times the amount the displayed image would be moved in response to the detected change position if the change in head position were detected during normal mode operation, as part of being configured to change the center portion of the displayed scene by an amount which is a function of the detected change in head position and the zoom factor.

The mode controller 1228 is configured to control the system 1200 to operate in different modes, e.g., based on user selection of a particular mode of operation such as the zoom mode of operation or normal mode of operation. In some embodiments upon the user interface 1204 detecting a user input indicating a zoom mode of operation the mode controller 1228 controls the system 1200 to operate in a zoom mode of operation, e.g., where simulated viewing of scene portion(s) of displayed scene through binoculars is presented to the user.

In some embodiments the user input interface 1204 detects a user input indicating a switch from the zoom mode of operation to a normal mode of operation, e.g., upon user's selection of the normal mode. During normal operation and initialization of system 1200 the mode controller 1228 controls the device to operate in a normal mode of operation where image content in displayed in a normal manner without zooming. In some embodiments the simulator 1224 is further configured to cease the zooming and masking operations in response to the user input interface 1204 detecting the input indicating a switch from the zoom mode of operation to the normal mode of operation.

The content stream information 1238 includes information regarding a plurality of content streams that may be available for receiving and use in playback. In some embodiments the stream information 1238 is provided by the content provider's content delivery system 1100 (e.g., stream information 1136). In some embodiments the stream information 1238 includes, for a plurality of available content streams, one of a multicast address of a multicast group which can be joined to receive a given content stream corresponding to a given portion of scene, e.g., front scene portion, rear left, rear right portion etc. In some embodiments the stream information 1238 further includes information which can be used to request access to a switched digital video channel used to provide a given content stream, or channel tuning information which can be used to control a tuner of the playback system 1200 to tune to a broadcast channel on which a given content stream corresponding to a given scene portion is broadcast.

In some embodiments the modules and/or elements shown in the memory 1212 are implemented as software modules. In other embodiments the elements, while shown to be included in the memory 1212, are implemented in hardware, e.g., as individual circuits with each element being implemented as a circuit for performing the function corresponding to the element. In still other embodiments the modules and/or elements are implemented using a combination of software and hardware.

While shown in FIG. 12 example to be included in the memory 1212, the modules and elements shown included in the memory 1212 can, and in some embodiments are, implemented fully in hardware within the processor 1208, e.g., as individual circuits. In other embodiments some of the elements are implemented, e.g., as circuits, within the processor 1208 with other elements being implemented, e.g., as circuits, external to and coupled to the processor 1208. As should be appreciated the level of integration of modules on the processor and/or with some modules being external to the processor may be one of design choice. Alternatively, rather than being implemented as circuits, all or some of the elements may be implemented in software and stored in the memory 1212 of the system 1200, with the software modules controlling operation of the system 1200 to implement the functions corresponding to the modules when the modules are executed by a processor, e.g., processor 1208. In still other embodiments, various elements are implemented as a combination of hardware and software, e.g., with a circuit external to the processor 1208 providing input to the processor 1208 which then under software control operates to perform a portion of a module's function.

While shown in the FIG. 12 embodiment as a single processor, e.g., computer, it should be appreciated that the processor 1208 may be implemented as one or more processors, e.g., computers. When one or more elements in the memory 1212 are implemented as software modules, the modules include code, which when executed by the processor 1208, configure the processor 1208 to implement the function corresponding to the module. In embodiments where the various modules shown in FIG. 12 are stored in the memory 1212, the memory 1212 is a computer program product comprising a computer readable medium comprising code, e.g., individual code for each module, for causing at least one computer, e.g., processor 1208, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIGS. 11 and 12 control and/or configure the systems 1100 and 1200 or elements therein respectively such as the processor 1108 and 1208 to perform the functions of corresponding steps of the methods of the present invention, e.g., such as those illustrated and/or described in the flowchart 900.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of operating an interactive system, the method comprising:
   displaying a scene on a first portion of a display;
   detecting user input indicating a zoom mode of operation; and
   in response to the detected user input indicating the zoom operation, simulating viewing of a portion of said scene through binoculars, said simulating viewing of the portion of the scene through binoculars including using a second portion of said display to display a zoomed version of said portion of said scene while a third portion of said display is blocked from displaying a portion of said scene, said second portion of the display being smaller than said first portion of the display, said second and third portions being different portions of said first portion of the display.

2. The method of claim 1, wherein displaying a scene on the display includes:
   outputting stereoscopic image pairs on the display to provide a 3D presentation of said scene, said scene corresponding to an event, each stereoscopic image pair including a left eye view and a right eye view.

3. The method of claim 1, wherein simulating viewing of the portion of the scene through binoculars includes displaying a mask on said third portion of the display.

4. A method of operating an interactive system, the method comprising:
   displaying a scene on a display;
   detecting user input indicating a zoom mode of operation; and
   in response to the detected user input indicating the zoom operation, simulating viewing of a portion of said scene through binoculars, wherein simulating viewing of a portion of said scene includes:
   performing a zoom operation on a first left eye image; and applying a mask to zoomed first left eye image simulating a viewing constraint corresponding to viewing through binoculars to generate a masked zoomed left eye image.

5. The method of claim 4, further comprising:
displaying the masked zoomed left eye image.

6. The method of claim 5, wherein simulating viewing of a portion of said scene further includes:
performing a zoom operation on a first right eye image corresponding to the first left eye image;
applying a mask to the zoomed right eye image simulating a viewing constraint corresponding to viewing through binoculars to generate a masked zoomed right eye image; and
displaying the masked zoomed right eye image while said masked zoomed left eye image is being displayed.

7. The method of claim 6, further comprising:
applying zooming and masking operations on additional left and right eye images prior to displaying said additional left and right eye images for a period of time in which said interactive system is in said zoom mode of operation.

8. The method of claim 7, further comprising:
detecting user input indicating a switch from said zoom mode of operation to a normal mode of operation; and
ceasing said zooming and masking operations prior to displaying left and right eye images in response to detecting input indicating a switch from said zoom mode of operation to said normal mode of operation.

9. A method of operating an interactive system, the method comprising:
displaying a scene on a display;
detecting user input indicating a zoom mode of operation; and
in response to the detected user input indicating the zoom operation, simulating viewing of a portion of said scene through binoculars;
monitoring user head position;
detecting a change in user head position; and
changing a center portion of the displayed scene by an amount which is a function of the detected change in head position and a zoom factor used during said zoom mode of operation.

10. The method of claim 9, further comprising:
receiving user input indicating the zoom factor to be used during said zoom mode of operation; and
wherein changing the center portion of the displayed scene by an amount which is a function of the detected change in head position and the zoom factor includes moving the center of the displayed scene by an amount which is the zoom factor times the amount the displayed image would be moved in response to the detected change position if the change in head position were detected during normal mode operation.

11. An interactive system, comprising:
a display device configured to display images corresponding to a scene on a first portion of the display device;
a user input interface configured to detect user input indicating a zoom mode of operation; and
a simulator configured to simulate viewing of a portion of said scene through binoculars in response to the detected user input indicating the zoom operation, said simulating viewing of the portion of the scene through binoculars including using a second portion of said display device to display a zoomed version of said portion of said scene while a third portion of said display is blocked from displaying a portion of said scene, said second portion of the display device being smaller than said first portion of the display, said second and third areas being different portions of said first portion of the display device.

12. The system of claim 11, wherein said display device is configured, as part of being configured to display images corresponding to a scene, to:
output stereoscopic image pairs on the display device to provide a 3D presentation of said scene, said scene corresponding to an event, each stereoscopic image pair including a left eye view and a right eye view.

13. An interactive system, comprising:
a display device configured to display images corresponding to a scene;
a user input interface configured to detect user input indicating a zoom mode of operation; and
a simulator configured to simulate viewing of a portion of said scene through binoculars in response to the detected user input indicating the zoom operation, wherein said simulator is configured, as part of being configured to simulate viewing of a portion of said scene through binoculars, to:
perform a zoom operation on a first left eye image; and
apply a mask to zoomed first left eye image simulating a viewing constraint corresponding to viewing through binoculars to generate a masked zoomed left eye image.

14. The system of claim 13, wherein said display device is further configured to:
display the masked zoomed left eye image.

15. The system of claim 14,
wherein said simulator is further configured, as part of being configured to simulate viewing of a portion of said scene through binoculars, to:
perform a zoom operation on a first right eye image corresponding to the first left eye image; and
apply a mask to the zoomed right eye image simulating a viewing constraint corresponding to viewing through binoculars to generate a masked zoomed right eye image; and
wherein said display device is further configured to display the masked zoomed right eye image while said masked zoomed left eye image is being displayed.

16. The system of claim 15, wherein said simulator is further configured to perform zooming and masking operations on additional left and right eye images prior to said additional left and right eye images being displayed by said display device for a period of time in which said interactive system is in said zoom mode of operation.

17. The system of claim 16,
wherein said user input interface is configured to detect user input indicating a switch from said zoom mode of operation to a normal mode of operation; and
wherein said simulator is further configured to cease said zooming and masking operations in response to said user input interface detecting said input indicating a switch from said zoom mode of operation to said normal mode of operation.

18. An interactive system, comprising:
a display device configured to display images corresponding to a scene;
a user input interface configured to detect user input indicating a zoom mode of operation;
a simulator configured to simulate viewing of a portion of said scene through binoculars in response to the detected user input indicating the zoom operation;

a head position monitoring module configured to monitor user head position for detecting a change in user head position; and a display controller configured to change a center portion of the displayed scene by an amount which is a function of the detected change in head position and a zoom factor used during said zoom mode of operation.

19. The system of claim 18, further comprising:

wherein said user input interface includes a receiver configured to receive user input indicating the zoom factor to be used during said zoom mode of operation; and wherein said display controller is configured to move the center of the displayed scene by an amount which is the zoom factor times the amount the displayed image would be moved in response to the detected change position if the change in head position were detected during normal mode operation, as part of being configured to change the center portion of the displayed scene by an amount which is a function of the detected change in head position and the zoom factor.

20. A non-transitory machine readable medium comprising processor executable instructions, which when executed by a processor, control a playback system to:

display a scene on a display device;

detect user input indicating a zoom mode of operation; and simulate viewing of a portion of said scene through binoculars in response to said user input indicating a zoom mode of operation, wherein simulating viewing of a portion of said scene includes:

performing a zoom operation on a first left eye image; and applying a mask to zoomed first left eye image simulating a viewing constraint corresponding to viewing through binoculars to generate a masked zoomed left eye image.

* * * * *